United States Patent

Burczyk et al.

(10) Patent No.: US 8,910,973 B2
(45) Date of Patent: Dec. 16, 2014

(54) SAFETY BELT FOR A VEHICLE

(75) Inventors: Christian Burczyk, Stuttgart (DE);
Hakan Ipek, Schoenaich (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 13/703,207

(22) PCT Filed: May 17, 2011

(86) PCT No.: PCT/EP2011/002439
§ 371 (c)(1),
(2), (4) Date: Jan. 3, 2013

(87) PCT Pub. No.: WO2011/154083
PCT Pub. Date: Dec. 15, 2011

(65) Prior Publication Data
US 2013/0127141 A1    May 23, 2013

(30) Foreign Application Priority Data

Jun. 11, 2010   (DE) .................... 10 2010 023 478

(51) Int. Cl.
*B60R 21/18* (2006.01)
*B60R 22/12* (2006.01)

(52) U.S. Cl.
CPC *B60R 21/18* (2013.01); *B60R 22/12* (2013.01)
USPC ...................................................... 280/733

(58) Field of Classification Search
USPC ............. 280/733, 801.1, 808; 24/163 R, 198, 24/633; 297/471, 483, 482
See application file for complete search history.

(56) References Cited

U.S. PATENT DOCUMENTS

| | | | |
|---|---|---|---|
| 3,791,670 A | 2/1974 | Lucore et al. | |
| 3,820,842 A | 6/1974 | Stephenson | |
| 3,953,070 A * | 4/1976 | Fisher | 297/474 |
| 5,303,953 A * | 4/1994 | Kamiyama et al. | 280/733 |
| 5,383,713 A * | 1/1995 | Kamiyama et al. | 297/471 |
| 6,279,945 B1 * | 8/2001 | Schneider et al. | 280/733 |
| 6,419,264 B1 | 7/2002 | Tsuji et al. | |
| 7,922,195 B2 * | 4/2011 | Nezaki | 280/733 |
| 2004/0250387 A1 * | 12/2004 | Jones et al. | 24/633 |
| 2006/0170200 A1 * | 8/2006 | Sundararajan et al. | 280/733 |
| 2010/0308637 A1 | 12/2010 | Strutz | |

FOREIGN PATENT DOCUMENTS

| | | |
|---|---|---|
| DE | 200 04 363 U1 | 9/2000 |
| DE | 10 2005 004 818 A1 | 8/2006 |
| EP | 1 457 392 A1 | 9/2004 |
| EP | 1 785 318 A2 | 5/2007 |
| WO | WO 2007/065543 A1 | 6/2007 |
| WO | WO 2007065543 A1 * | 6/2007 |

OTHER PUBLICATIONS

International Search Report with English translation dated Aug. 25, 2011 (six (6) pages).
German-Language Written Opinion (PCT/ISA/237) (five (5) pages).

* cited by examiner

*Primary Examiner* — Paul N Dickson
*Assistant Examiner* — Robert A Coker
(74) *Attorney, Agent, or Firm* — Crowell & Moring LLP

(57) ABSTRACT

A seatbelt for a vehicle that includes a belt strap composed of a plurality of belt strap layers and at least one belt inner space which can be impacted with a gas. The belt strap is guided through a recess of a buckle tongue, which can be inserted into a belt buckle. A holding element is arranged on the belt strap, the holding element holds the buckle tongue in a defined position when the belt strap is in a retracted state.

10 Claims, 3 Drawing Sheets

SAFETY BELT FOR A VEHICLE

BACKGROUND AND SUMMARY OF THE INVENTION

Figure 1:
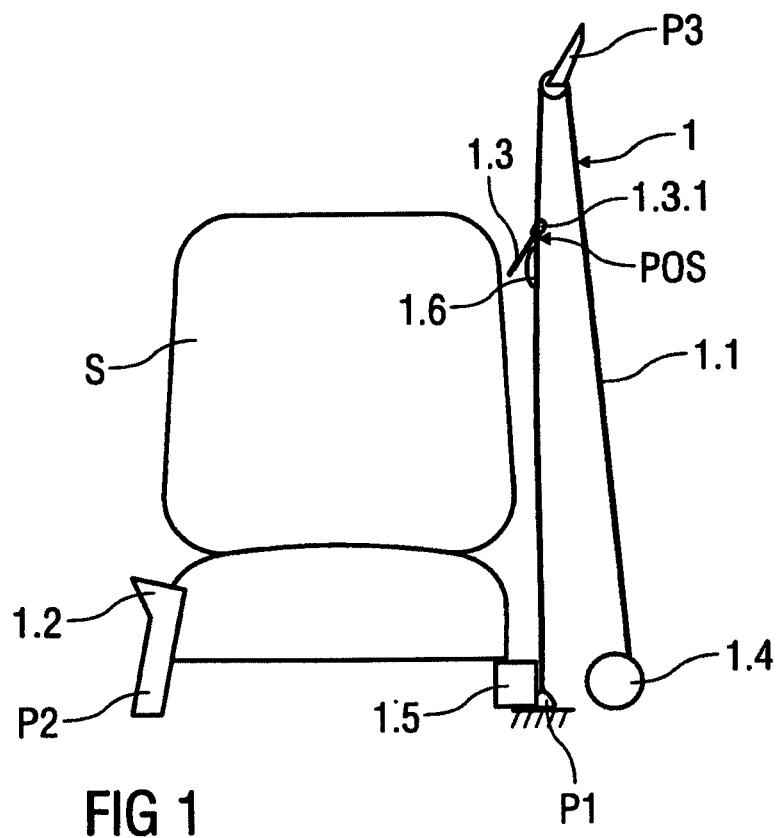

Exemplary embodiments of the present invention relate to a seatbelt for a vehicle, comprising a belt strap that is composed of a plurality of belt strap layers and at least one belt inner space that can be impacted with a gas, wherein the belt strap is guided through a recess of a buckle tongue which can be inserted into a belt buckle.

European Patent Document EP 1 457 392 A1 discloses a seatbelt for protecting a vehicle occupant that comprises a buckle tongue with a guide-through element for a belt strap. The seatbelt further comprises a belt buckle fastened to the vehicle that is provided to receive the buckle tongue and a seatbelt retractor device for retracting the belt strap, the seatbelt retractor also being fastened to the vehicle. The belt strap is formed from a flexible fabric tube, wherein a first end of the belt strap is connected to the vehicle and the other end to the retractor device. A middle section of the belt strap is guided through the guide-through element of the buckle tongue. The seatbelt is formed as a three-point seatbelt with a lap portion and a torso portion. The seatbelt further comprises an inflatable airbag element that extends within the belt strap from the first end into the torso region. The belt strap comprises, in areas, a reinforced tube that surrounds the airbag element and is arranged between the airbag element and the flexible fabric tube forming the belt strap. The reinforced tube is thereby arranged in the lap region so that the airbag element and the belt strap unfold upon impact of the airbag element in the region of the torso region. The impacting of the airbag element with a gas takes place if the vehicle collides with an obstacle.

Exemplary embodiments of the present invention are directed to an improved seatbelt for a vehicle.

The seatbelt for a vehicle comprises a belt strap that is composed of a plurality of belt strap layers and at least one belt inner space, which can be impacted with a gas, wherein the belt strap is guided through a recess of a buckle tongue which can be inserted into a belt buckle.

According to the invention a holding element is arranged on the belt strap, the holding element holds the buckle tongue in a defined position when the belt strap is in a retracted state. The buckle tongue is thereby prevented from slipping downwards into a position that is hard to reach for the vehicle occupant in such a way that a high degree of comfort is achieved for the occupants of the vehicle. In particular the buckle tongue is held in a grip-favorable position.

According to a further aspect of the invention the holding element is fixed to precisely one of the at least two belt strap layers. This results in a particularly advantageous manner in the influence of the holding element upon the unfolding of the belt strap being reduced when said belt strap is impacted with the gas.

The holding element preferably thereby comprises an outer element arranged on an outer side of the belt strap layer and an inner element arranged on an inner side of the belt strap layer and connected to the outer element, so that a reliable fixing of the holding element on the belt strap layer is possible.

The outer element and the inner element preferably comprise precisely one common fixing point. The holding element thus lies, when the belt strap is unfolded and impacted with gas, tangentially and only on a line extending parallel to the belt strap on the outer side of the belt strap layer. This results in a further reduction in the influence of the holding element upon the unfolding of the belt strap. The release of the holding element from the belt strap when the belt strap is impacted with the gas is avoided.

According to an alternative embodiment the outer element and the inner element comprise a plurality of common fixing points. This embodiment facilitates a very stable fixing of the holding element.

In order to achieve a low degree of influence upon the unfolding of the belt strap through the holding element both in the design of the holding element with a fixing point and in the design of the holding element with a plurality of fixing points, the outer element and/or the inner element is/are preferably flexible, in particular being formed to be easily plastically or elastically deformable. The outer element and the inner element are thereby preferably made of plastic, silicone or rubber. As a result of this easy deformability, a deformation of the holding element takes place in the same way as the deformation of the belt strap. This means that the holding element follows the deformation of the belt strap. A release of the holding element is also avoided here when the belt strap is impacted with the gas.

In an alternative or additional design to the plastic or elastic deformability, one or more depressions are incorporated into the outer element, the depressions are orientated from its surface in the direction of the belt strap layer in such a way that the outer element is subdivided into a plurality of outer element segments. This results in a particularly advantageous way in a further improved deformation of the outer element upon deformation of the belt strap when said belt strap is impacted with the gas.

One or more depressions are thereby preferably incorporated into the inner element orientated from the surface thereof in the direction of the belt strap layer in such a way that the inner element is subdivided into a plurality of inner element segments. The deformation of the inner element thus also takes place when the belt strap is impacted with the gas in the same way as the deformation of the belt strap.

If the deformation of both of the inner element and of the outer element occurs when the belt strap is impacted with the gas in the same way as the deformation of the belt strap, an uninfluenced unfolding of the belt strap can take place.

In an alternative development to fixing the holding element to precisely one of the belt strap layers of the seatbelt according to the invention, the holding element is formed to at least partially engage around the belt strap.

The holding element is thereby preferably formed as a slide element and arranged so that it can be displaced at least in the direction of a length extension of the belt strap on the belt strap so that the position, in which the buckle tongue is to be held, can be specified individually by the vehicle occupant.

In order to facilitate a deformation of the holding element formed as a slide element when the belt strap is impacted with the gas, the holding element is preferably particularly easily elastically deformable.

Alternatively or additionally, a length extension and/or width extension of the holding element formed as a slide element can be changed in such a way that an optimized form adaptation of the holding element to the belt strap can take place.

BRIEF DESCRIPTION OF THE DRAWING FIGURES

Figure 2:
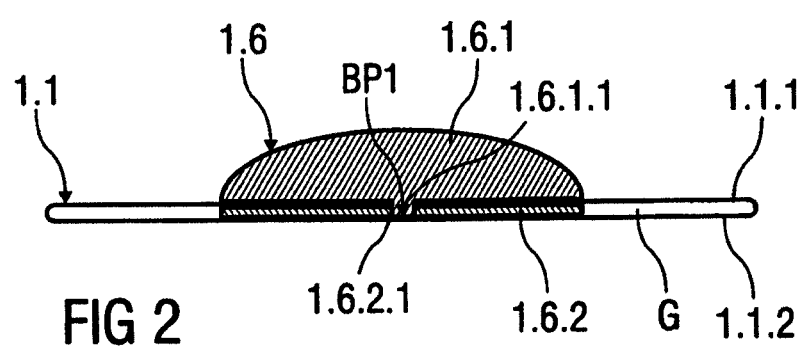
Figure 3:
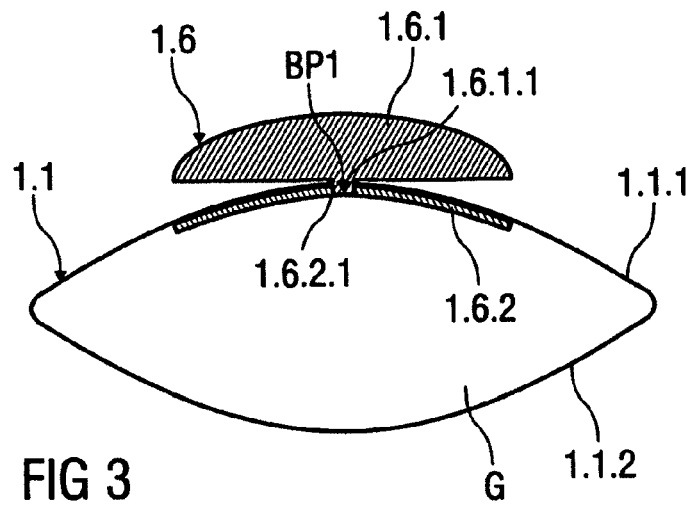
Figure 4:
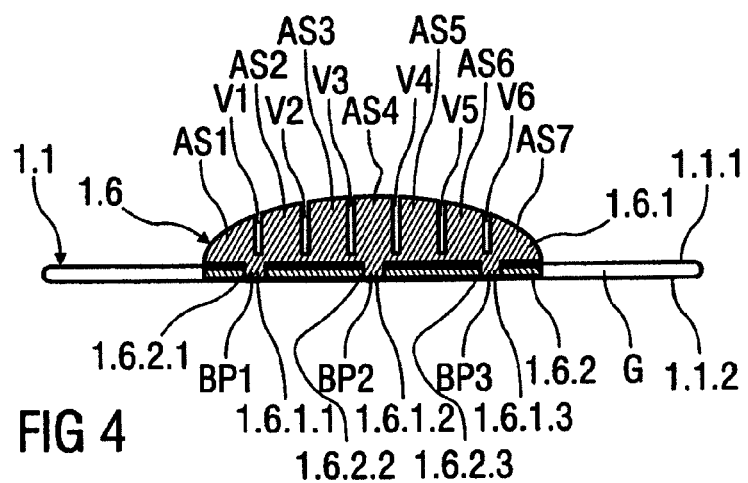
Figure 5:
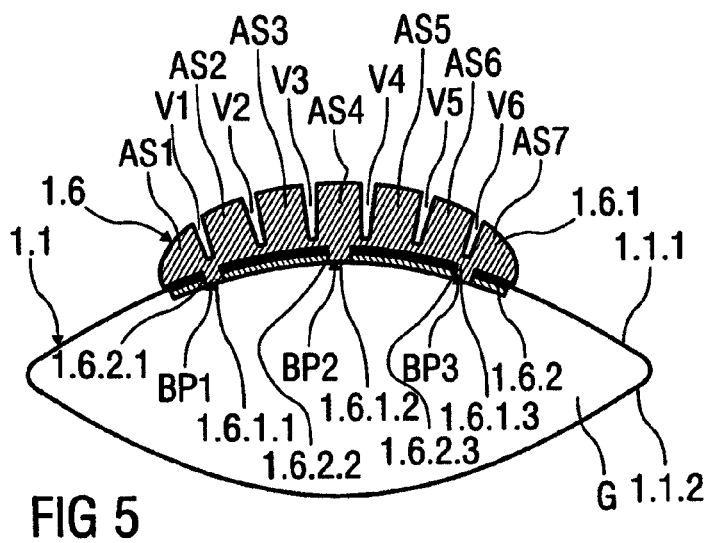
Figure 6:
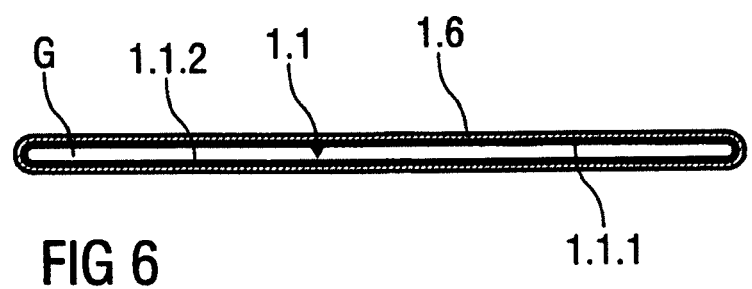
Figure 7:
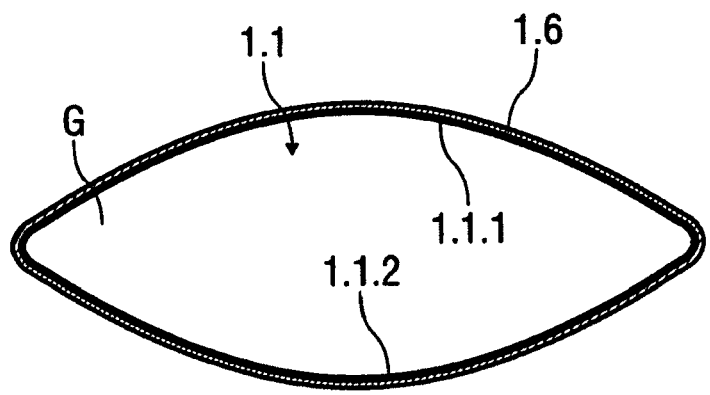

Exemplary embodiments of the invention are explained in greater detail below by reference to drawings, in which:

FIG. 1 is a schematic illustration of a vehicle seat and a seatbelt according to the invention, FIG. 2 is a schematic illustration of a sectional illustration of a first exemplary embodiment of a belt strap for the seatbelt according to FIG. 1 in the region of a holding element, FIG. 3 is a schematic illustration of a sectional illustration of a belt strap according to FIG. 2 impacted with gas, FIG. 4 is a schematic illustration of a sectional illustration of a second exemplary embodiment of a belt strap for the seatbelt according to FIG. 1 in the region of a holding element, FIG. 5 is a schematic illustration of a sectional illustration of a belt strap according to FIG. 4 impacted with gas, FIG. 6 is a schematic illustration of a sectional illustration of a third exemplary embodiment of a belt strap for the seatbelt according to FIG. 1 in the region of a holding element, and FIG. 7 is a schematic illustration of a sectional illustration of a belt strap according to FIG. 6 impacted with gas.

Corresponding parts are provided with the same reference numerals in all the figures.

DETAILED DESCRIPTION

FIG. 1 shows a cut-out of a vehicle inner space with a vehicle seat S and a seatbelt 1 according to the invention arranged beside the vehicle seat S, said seatbelt 1 having a belt strap 1.1 in a retracted state.

The seatbelt 1 is a so-called three-point seatbelt which connects a vehicle occupant at three points P1 to P3 to a vehicle body.

A first point P1 is found in the lower region beside the vehicle seat S, in particular on a B-pillar of the vehicle. At this first point P1 the belt strap 1.1 of the seatbelt 1 is fixed to the vehicle body.

When the seatbelt 1 is in use the belt strap 1.1 is guided from this first point P1 via the lap region of a vehicle occupant (not shown) to a second point P2, which is formed by a belt buckle 1.2 fixed to the vehicle body, preferably with an integrated buckle tightener (not shown). A so-called buckle tongue 1.3 engages in the belt buckle 1.2 or is connected to it.

The belt strap 1.1 is guided through a recess 1.3.1 in the buckle tongue 1.3 and deflected. The buckle tongue 1.3 engaging in the belt buckle 1.2 thereby forms a lower deflection point. In order to adapt a length of the seatbelt 1 individually to the body size of the vehicle occupant, the belt strap 1.1 is arranged so as to be displaceable in the buckle tongue 1.3.

The belt strap 1.1 is guided from the lower deflection point via a torso region of the vehicle occupant to an upper deflection point which forms the third point P3.

The upper deflection point is preferably arranged to be height-adjustable on the B-pillar of the vehicle so that the height of the seatbelt 1 can be individually adjusted in dependence upon the body size of the vehicle occupant.

The belt strap 1.1 is guided from the upper deflection point to a seatbelt retractor device 1.4, which is preferably fixed in the lower region of the B-pillar of the vehicle. The belt retractor device 1.4 is provided to retract the belt strap 1.1 of the seatbelt 1 when it is not in use and to tighten the belt strap 1.1 on the body of the vehicle occupant when the seatbelt 1 is in use. The belt retractor device 1.4 preferably additionally comprises a so-called retractor tightening device, by means of which the belt strap 1.1 can be tightened in case of collision of the vehicle with an obstacle so that the vehicle occupant is optimally positioned in the vehicle seat S and optimal retention of the vehicle occupant takes place.

In order to avoid a load on the vehicle occupant in the event of a collision of the vehicle with an obstacle, the belt strap 1.1 is formed as a two-layer and inflatable belt strap which, upon detection of a collision or in case of an unavoidable collision, can already be filled with gas and unfolds before the collision. To achieve this a gas generator 1.5 is provided, by means of which a belt inner space G, which is formed between the belt strap layers 1.1.1 and 1.1.2 of the belt strap 1.1 (shown in greater detail in FIG. 2) can be impacted with gas.

Due to the displaceable arrangement of the belt strap 1.1 in the buckle tongue 1.3 it is necessary for the buckle tongue 1.3 to be held in the retracted state of the seatbelt 1 in a defined position POS so that slipping down of the buckle tongue 1.3 on the belt strap 1.1 is avoided. This results in the buckle tongue 1.3 being held in a grip-favorable position, whereby an increase in comfort is achieved for the vehicle occupant.

In order to fix the buckle tongue 1.3 in this position POS and to avoid it slipping down, a holding element 1.6 is arranged on the belt strap 1.1 which holds the buckle tongue 1.3 in the defined position POS when the belt strap 1.1 is in the retracted state.

It is hereby necessary for unfolding of the belt inner space G and the belt strap 1.1 not to be impaired by the holding element 1.6.

For this reason the holding element 1.6 is fixed in a first exemplary embodiment precisely to one of the two belt strap layers 1.1.1, 1.1.2, to the belt strap layer 1.1.1.

In FIG. 2 the belt strap 1.1 is shown in a sectional illustration in the region of the holding element 1.6, wherein the belt strap 1.1 is shown in the state not impacted with gas, i.e. not inflated.

The holding element 1.6 is thereby formed as a so-called seatbelt button and formed from an outer element 1.6.1 and an inner element 1.6.2.

The outer element 1.6.1 is arranged on an outer side of the belt strap layer 1.1.1 and formed in such a way that its thickness and the thickness of the belt strap 1.1 together are greater than the height of the recess 1.3.1 in the buckle tongue 1.3, through which the belt strap 1.1 is guided. The belt strap 1.1 is thus positioned in the position POS when the seatbelt 1 is in the retracted state. The outer side of the belt strap layer 1.1.1 advantageously forms, when the seatbelt 1 is in use, a side of the belt strap 1.1 facing away from the vehicle occupant so that the outer element 1.6.1 also faces away from the vehicle occupant. This results in great comfort for the vehicle occupant when the seatbelt 1 is in use.

In order to fix the outer element 1.6.1 on the belt strap layer 1.1.1, the inner element 1.6.2 is arranged on an inner side of the belt strap layer 1.1.1, i.e. on a side of the belt strap layer 1.1.1 facing the belt inner space G. The thickness of the inner element 1.6.2 is thereby formed to be preferably small so that the belt strap 1.1 and the belt inner space G also have a small thickness in the region of the holding element 1.6. Pressure loads on the body of the occupant perceived to be unpleasant are thereby minimized.

The outer element 1.6.1 and the inner element 1.6.2 are connected to each other at a common fixing point BP1. At this fixing point BP1 the outer element 1.6.1 comprises a fixing element 1.6.1.1 guided through the belt strap layer 1.1.1 that engages in a corresponding fixing element 1.6.2.1 of the inner element 1.6.2.

FIG. 3 shows the belt strap 1.1 in the state in which it is filled with gas. Due to the fixing of the outer element 1.6.1 at a fixing point BP1 to the inner element 1.6.2, an impairment in the deformation of the belt strap 1.1 caused by the holding element 1.6 is minimized when the belt strap 1.1 is filled with gas.

When the belt inner space G is impacted with the gas the belt strap layers 1.1.1 and 1.1.2 arch outwards in such a way that the belt strap has the form of a tube.

In order to also achieve uninfluenced arching of the belt strap layer 1.1.1 in the region of the holding element 1.6, the inner element 1.6.2 is designed to be flexible. The inner element 1.6.2 is thereby elastically or plastically deformable with low force so that the deformation takes place due to the arching of the belt strap layer 1.1.1.

The inner element 1.6.2 thus deforms corresponding to the arching of the belt strap layer 1.1.1 and, when the belt strap 1.1 is unfolded and impacted with gas, the outer element 1.6.1 lies tangentially and on a line extending parallel to the longitudinal extension to the belt strap 1.1 on the outer side of the belt strap layer 1.1.1.

The holding element 1.6 can also be designed with a smaller diameter than is shown in FIGS. 2 and 3 in relation to the width of the belt strap. The smaller the diameter of the holding element 1.6 the lower the deformation and thus the load of the inner element 1.6.2 when the belt strap 1.1 is unfolded and impacted with gas.

In a further development of the holding element 1.6 (which is not shown), the outer element 1.6.1 is also formed to be flexible, i.e. easily elastically or plastically deformable, so that the influencing of the unfolding of the belt strap 1.1 is further reduced.

Furthermore the belt strap 1.1 is folded once or repeatedly parallel to the longitudinal extension thereof. In the region of inner lying fold layers the belt strap 1.1 is preferably thinner than in the region of outer lying fold layers. This advantageously results in the belt strap 1.1 having a low thickness, a high flexibility and a low weight.

In particular, the belt strap 1.1 is folded in such a way that it has a flattened Z-shape in the front view. In this connection a strap width of the belt strap 1.1 is subdivided into three approximately equal width parts. A first outer part of the belt strap 1.1 is enveloped in such a way that the first outer part is arranged below a middle part of the belt strap 1.1. A second outer part is arranged after the envelopment on the middle part so that three fold layers are formed.

The fold layers of the belt strap 1.1 are connected to each other at the edge by means of woven or sewn tear-away threads, whereby the fold is fixed. The tear-away threads thereby form a seam at the edge.

When the belt inner space G is impacted with the gas the belt inner space G extends in such a way that the tear-away threads tear in a defined way upon reaching a predefined deformation of the belt strap 1.1 and the seams are thus destroyed. The predefined deformation of the belt strap 1.1 is produced upon reaching a predefined minimum pressure in the belt inner space G, whereby, due to the formation of the belt strap 1.1, tensile forces acting on the tear-away threads are produced, on the basis of which the tear-away threads tear. The belt strap 1.1 thus unfolds in that the fold layers of the belt strap 1.1 fold out.

In order to realize the fixing of the buckle tongue 1.3 in the position POS in the storage position of the seatbelt 1, the holding element 1.6 is fixed to one of the belt strap layers 1.1.1, 1.1.2 in such a way that the outer element 1.6.1 is arranged on an outer side of the belt strap 1.1.

FIG. 4 shows the belt strap 1.1 in a sectional illustration in the region of an alternative embodiment of the holding element 1.6, wherein the belt strap 1.1 is shown in the non-inflated state, in which it is not impacted with gas.

The holding element 1.6 is in turn formed as a so-called belt button and formed from an outer element 1.6.1 and an inner element 1.6.2, wherein the outer element 1.6.1 is arranged on the outer side of the belt strap layer 1.1.1 and the inner element 1.6.2 is arranged for fixing the outer element 1.6.1 on the belt strap layer 1.1.1 on the inner side of the belt strap layer 1.1.1.

The outer element 1.6.1 and the inner element 1.6.2 are connected to each other at three common fixing points BP1 to BP3. At these fixing points BP1 to BP3 the outer element 1.6.1 comprises three fixing elements 1.6.1.1 to 1.6.1.3 guided through the belt strap layer 1.1.1 which engage in a corresponding fixing element 1.6.2.1 to 1.6.2.3 of the inner element 1.6.2.

The outer element 1.6.1 is further divided into a plurality of outer element segments AS1 to AS7, whereby for the formation of these outer element segments AS1 to AS7 a plurality of depressions V1 to V6 orientated from the surface of the outer element 1.6.1 in the direction of the belt strap layer 1.1.1 are incorporated into the outer element 1.6.1 The depressions V1 to V6 are thereby incorporated in such a way that the individual outer element segments AS1 to AS7 are connected to each other on the bottom side. In order to facilitate the simple deformation of the outer element 1.6.1, the depressions V1 to V6 extend parallel to the longitudinal extension of the belt strap 1.1.

It follows from this alternative embodiment of the outer element 1.6.1 that when the belt strap 1.1 is impacted with gas the outer element 1.6.1 is easily mechanically deformable. A deformation of the outer element 1.6.1 thereby takes place according to the deformation or arching of the belt strap layer 1.1.1, whereby a force for deforming the outer element 1.6.1 is transferred by means of the incorporated gas and the resulting arching of the belt strap layer 1.1.1 from the belt strap layer 1.1.1 to the outer element 1.6.1.

The state of the belt strap 1.1 filled with gas and the deformation of the outer element 1.6.1 formed from a plurality of outer element segments AS1 to AS7 are shown in FIG. 5.

The deformation of the outer element 1.6.1 requires, due to the segmenting of the outer element 1.6.1, merely a low application of force, whereby during the deformation distances between the outer element segments AS1 to AS7 are enlarged, i.e. the depressions V1 to V6 are widened.

In addition the outer element 1.6.1 is formed to be elastically deformable so that any deformations of the outer element 1.6.1 are reversible during use of the seatbelt 1.

The inner element 1.6.2 is also mechanically deformable with low force application. The deformation thereby takes place plastically or elastically.

In an embodiment of the holding element 1.6 (which is not shown in further detail), the inner element 1.6.2 can additionally be formed from a plurality of inner element segments which, in accordance with the outer element 1.6.1 shown, are also formed by depressions incorporated parallel to the longitudinal extension of the belt strap 1.1. The depressions are, however, hereby directed towards the inner wall of the belt inner space G, i.e. to the belt strap layer 1.1.1, so that a deformation of the inner element 1.6.2 can take place according to the arching of the belt strap layer 1.1.1. The inner element 1.6.2 is preferably formed in this case from an elastically deformable material.

Even in case of the segmented configurations of the outer element 1.6.1 and/or the inner element 1.6.2, the belt strap can be folded (in a manner not shown in greater detail) according to the description of FIG. 3 once or repeatedly parallel to the longitudinal extension.

FIG. 6 shows the belt strap 1.1 and the holding element 1.6 in a sectional illustration, wherein an alternative embodiment of the holding element 1.6 is formed to completely engage around the belt strap 1.1. In an embodiment not shown in greater detail, the holding element 1.6 is formed to at least partially surround the belt strap 1.1.

The holding element 1.6 is designed as a slide element, i.e. it is arranged so that it can be displaced on the belt strap 1.1 in such a way that the position POS, in which the buckle tongue 1.3 is held, can be individually specified.

The holding element 1.6 is formed in one part in the exemplary embodiment shown. In order to facilitate a deformation of the holding element 1.6 corresponding to the belt strap 1.1, the holding element 1.6 is also easily elastically deformable in this embodiment, i.e. with low force, so that the deformation and an associated change in the length and/or width extension of the holding element 1.6 take place on the basis of the arching of the belt strap layers 1.1.1 and 1.1.2.

FIG. 7 shows the belt strap 1.1 filled with gas, wherein the belt strap layers 1.1.1 and 1.1.2 are arched outwardly by the inner pressure produced by means of the gas.

The holding element 1.6 is elastically deformed corresponding to the arching of the belt strap layers 1.1.1 and 1.1.2 so that the belt strap 1.1 can unfold without influence.

In an exemplary embodiment (which is not shown), the holding element 1.6 is formed from a plurality of parts that are telescopically connected to each other in such a way that a length extension and/or width extension of the holding element 1.6 takes place through a telescopic displacement of the parts to each other or into each other. The holding element 1.6 is thereby preferably formed from a material that can be elastically or plastically deformed with low force, meaning that the deformation of the holding element 1.6 also takes place according to the arching of the belt strap 1.1.

Even in the design of the holding element 1.6 partially or completely surrounding the belt strap 1.1, the belt strap 1.1 can be folded in turn in a manner not shown in greater detail according to the description of FIG. 3 once or repeatedly parallel to the longitudinal extension. The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

The invention claimed is:

1. A seatbelt for a vehicle, the seatbelt comprising:
    a belt strap composed of a plurality of belt strap layers and at least one belt inner space, which can be impacted with a gas, wherein the belt strap is configured so that it is guided through a recess of a buckle tongue configured for insertion into a belt buckle; and
    a holding element is arranged on the belt strap, wherein the holding element is configured to hold the buckle tongue in a defined position when the belt strap is in a retracted state,
    wherein the holding element is fixed to precisely one of the at least two belt strap layers,
    wherein the holding element comprises an outer element arranged on an outer side of the belt strap layer and an inner element connected thereto and arranged on an inner side of said belt strap layer, and
    wherein the outer element or the inner element is flexible.

2. The seatbelt according to claim 1, wherein the outer element and the inner element have a common fixing point.

3. The seatbelt according to claim 1, wherein the outer element and the inner element have a plurality of common fixing points.

4. The seatbelt according to claim 1, wherein one or more depressions orientated from a surface of the inner element in a direction of the belt strap layers are incorporated into the inner element in such a way that the inner element is subdivided into a plurality of inner element segments.

5. The seatbelt according to claim 1, wherein the holding element directly engages with the buckle tongue to hold the buckle tongue in the defined position.

6. The seatbelt according to claim 1, wherein the inner element is arranged within the at least one belt inner space.

7. A seatbelt for a vehicle, the seatbelt comprising:
    a belt strap composed of a plurality of belt strap layers and at least one belt inner space, which can be impacted with a gas, wherein the belt strap is configured so that it is guided through a recess of a buckle tongue configured for insertion into a belt buckle; and
    a holding element is arranged on the belt strap, wherein the holding element is configured to hold the buckle tongue in a defined position when the belt strap is in a retracted state,
    wherein the holding element is fixed to precisely one of the at least two belt strap layers,
    wherein the holding element comprises an outer element arranged on an outer side of the belt strap layer and an inner element connected thereto and arranged on an inner side of said belt strap layer,
    wherein the outer element or the inner element is flexible, and
    wherein one or more depressions extend from a surface of the outer element in a direction of the belt strap layers, wherein the one or more depressions are incorporated into the outer element in such a way that the outer element is subdivided into a plurality of outer element segments.

8. The seatbelt according to claim 7, wherein the holding element directly engages with the buckle tongue to hold the buckle tongue in the defined position.

9. The seatbelt according to claim 7, wherein the inner element is arranged within the at least one belt inner space.

10. A seatbelt for a vehicle, the seatbelt comprising:
    a belt strap composed of a plurality of belt strap layers and at least one belt inner space, which can be impacted with a gas, wherein the belt strap is configured so that it is guided through a recess of a buckle tongue configured for insertion into a belt buckle; and
    a holding element is arranged on the belt strap, wherein the holding element is configured to directly engage with the buckle tongue in such a manner that the buckle tongue is held in a defined position when the belt strap is in a retracted state,
    wherein the holding element completely engages around the belt strap,
    wherein the holding element is elastically deformable or changeable in a longitudinal extension or width extension,
    wherein the holding element is a slide element that is displaceable along the belt strap.

* * * * *